United States Patent
Ruiz et al.

(10) Patent No.: US 10,087,020 B1
(45) Date of Patent: Oct. 2, 2018

(54) UNIVERSAL OBJECT HOLDER FOR 3-D PRINTING USING A CONFORMABLE GRIPPER BALL

(71) Applicant: XEROX CORPORATION, Norwalk, CT (US)

(72) Inventors: Erwin Ruiz, Rochester, NY (US); Linn C Hoover, Webster, NY (US); Jeffrey J Bradway, Rochester, NY (US); Paul M Fromm, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/626,200

(22) Filed: Jun. 19, 2017

Related U.S. Application Data (60) Provisional application No. 62/480,563, filed on Apr. 3, 2017.

(51) Int. Cl.
| | |
|---|---|
| *B65G 47/91* | (2006.01) |
| *B33Y 40/00* | (2015.01) |
| *B25J 15/06* | (2006.01) |
| *B25J 15/00* | (2006.01) |

(52) U.S. Cl.
CPC .......... *B65G 47/91* (2013.01); *B25J 15/0023* (2013.01); *B25J 15/0095* (2013.01); *B25J 15/0616* (2013.01); *B33Y 40/00* (2014.12)

(58) Field of Classification Search
CPC ................ B25J 15/0023; B25J 15/0095; B25J 15/0616; B25J 15/0691; B33Y 30/00; B33Y 40/00; B41J 3/4073; B65G 47/91
USPC .................................................. 294/86.4, 185
See application file for complete search history.

(56) References Cited

U.S. PATENT DOCUMENTS

| | | | | |
|---|---|---|---|---|
| 4,561,686 | A * | 12/1985 | Atchley | B66C 1/0206 294/188 |
| 5,042,862 | A * | 8/1991 | Tubke | B65G 47/90 294/103.1 |
| 5,628,539 | A * | 5/1997 | Muchalov | B65G 47/90 294/103.1 |
| 7,600,450 | B2 | 10/2009 | Montgomery et al. | |
| 8,882,165 | B2 | 11/2014 | Lipson et al. | |
| 8,926,047 | B2 * | 1/2015 | LaCaze | B41J 2/1752 101/40 |
| 9,827,784 | B1 * | 11/2017 | Buchar | B41J 2/04501 |

(Continued)

FOREIGN PATENT DOCUMENTS

| | | | |
|---|---|---|---|
| DE | 102012012289 A1 * | 12/2012 | ................ B25J 9/06 |

OTHER PUBLICATIONS

U.S. Appl. No. 15/163,880, filed May 25, 2016, and entitled System for Printing on Three-Dimensional (3D) Objects by Wayne A. Buchar et al.

*Primary Examiner* — Dean J Kramer (57) ABSTRACT

A system for securing, holding and aligning an object in a rigid subassembly include a conformable gripper ball. The gripper ball having the capability to conform to an object and then hold the object after contact. The conformability of the gripper ball is changed with air pressure to allow the gripper ball to hold the object. The gripper ball is mounted onto a rigid frame, which can then be docked into a loading station of a printer that prints on 3-D objects. With the addition of a vision system, the gripper assembly could be used with alignment markings on the loading station to allow manual alignment of the object to the rigid subassembly prior to loading into the printer.

19 Claims, 9 Drawing Sheets

(56) References Cited

U.S. PATENT DOCUMENTS

| | | | |
|---|---|---|---|
| 2006/0033350 A1* | 2/2006 | Besch | B25B 5/065 294/119.3 |
| 2015/0272749 A1* | 10/2015 | Amend, Jr. | B25J 15/08 623/64 |
| 2017/0072572 A1* | 3/2017 | Wagner | B25J 15/0616 |

* cited by examiner

UNIVERSAL OBJECT HOLDER FOR 3-D PRINTING USING A CONFORMABLE GRIPPER BALL

CROSS-REFERENCE TO RELATED APPLICATION

This application claims the benefit of U.S. Provisional Application No. 62/480,563, filed on Apr. 3, 2017.

Cross-referenced is commonly assigned U.S. application Ser. No. 15/477,125, filed Apr. 3, 2017, and entitled VACUUM TUBE OBJECT CLAMPING ARRAY WITH CONFORMABLE PADS by Timothy P. Foley et al; U.S. application Ser. No. 15/477,127, filed Apr. 3, 2017, and entitled APPARATUS FOR HOLDING DURING THREE-DIMENSIONAL (3D) OBJECTS DURING PRINTING THEREON by Jeffrey J. Bradway et al; U.S. application Ser. No. 15/477,126, filed Apr. 3, 2017, and entitled UNIVERSAL PART GRIPPER WITH CONFORMABLE TUBE GRIPPERS by Linn C. Hoover et al; U.S. application Ser. No. 15/477,427, filed Apr. 3, 2017, and entitled SPRING LOADED SUCTION CUP ARRAY GRIPPER by Paul M. Fromm et al; U.S. application Ser. No. 15/477,439, filed Apr. 3, 2017, and entitled UNIVERSAL PART GRIPPER USING 3-D PRINTED MOUNTING PLATE by Linn C. Hoover et al; U.S. application Ser. No. 15/477,454, filed Apr. 3, 2017, and entitled APPARATUS FOR GENERAL OBJECT HOLDING DURING PRINTING USING MULTIPLE CONFORMABLE BALLS by Jeffrey J. Bradway et al; U.S. application Ser. No. 15/477,464, filed Apr. 3, 2017, and entitled AIR PRESSURE LOADED MEMBRANE AND PIN ARRAY GRIPPER by Paul M. Fromm et al; U.S. application Ser. No. 15/477,488, filed Apr. 3, 2017, and entitled APPARATUS FOR REPEATABLE STAGING AND HOLDING OBJECTS IN A DIRECT TO OBJECT PRINTER USING AN ARRAY OF PINS by Jeffrey J. Bradway et al; and U.S. application Ser. No. 15/477,478, filed Apr. 3, 2017, and entitled SPRING LOADED IRIS MECHANISM STACK GRIPPER by Paul M. Fromm et al; all of which are included in their entirety herein by reference.

TECHNICAL FIELD

This disclosure relates generally to printing on three-dimensional (3-D) objects, and more particularly, to an apparatus adapted for general object holding while printing on such objects in a non-production environment.

BACKGROUND

Commercial article printing typically occurs during the production of the article. For example, ball skins are printed with patterns or logos prior to the ball being completed and inflated. Consequently, a non-production establishment, such as a distribution site, which customizes products, for example, in region in which potential product customers support multiple professional or collegiate teams, needs to keep an inventory of products bearing the logos of the various teams. Ordering the correct number of products for each different logo to maintain the inventory can be problematic.

One way to address these issues in non-production outlets would be to keep unprinted versions of the products, and print the patterns or logos on them at the distribution site. Adapting known printing techniques, such as two-dimensional (2-D) media printing technology, to apply image content onto 3-D objects would be difficult. Since the surfaces to be printed must be presented to the print heads as relatively flat, 2-D surfaces, the objects have to be maneuvered carefully to present portions of the articles as parallel planes to the print heads.

One Direct to Object printing system that accomplishes this is disclosed in copending and commonly assigned U.S. patent application Ser. No. 15/163,880, filed on May 25, 2016, and entitled SYSTEM FOR PRINTING ON THREE-DIMENSIONAL (3D) OBJECTS by Wayne A. Buchar et al. This printing system includes a plurality of print heads arranged in a 2-D array, each printhead being configured to eject marking material, a support member positioned to be parallel to a plane formed by 2-D array of print heads, a member movably mounted to the support member, an actuator operatively connected to the movably mounted member to enable the actuator to move the moveably mounted member along the support member, an object holder configured to mount to the movably mounted member to enable the object holder to pass the array of print heads as the moveably mounted member moves along the support member, and a controller operatively connected to the plurality of print heads and the actuator, the controller being configured to operate the actuator to move the object holder past the array of print heads and to operate the plurality of print heads to eject marking material onto objects held by the object holder as the object holder passes the array of print heads. This application is included herein by reference to the extent necessary to the practice the present disclosure and in its entirety.

A problem with this approach is that it requires a unique part gripper for each part that is to be printed. Part grippers are currently machined metal brackets with dedicated locating and fastening features machined into each gripper. Customer productivity is impacted using these part grippers due to the time required to design and make a unique mounting plate for each part and the costs associated with each part gripper design. A standalone spherical shaped conformable gripper filled with granular material is shown in U.S. Pat. No. 8,882,165 and U.S. Pat. No. 7,600,450 shows curvature conformable gripping dies used in the oil industry that do not appear to be readily adaptable to holding objects for 3-D printing.

SUMMARY

In answer to the heretofore-mentioned shortcomings, disclosed is a universal gripper for many types of objects. The universal gripper includes at least one granulated comfortable ball gripper and a unique loading station to secure and align an object to a rigid subassembly. Once the object is secured on the subassembly an operator can install the assembly into a printer carriage and proceed to print an image on the object.

BRIEF DESCRIPTION OF THE DRAWINGS

The foregoing aspects and other features of a printing system that prints images on 3-D objects held by a universal holder are explained in the following description, taken in connection with the accompanying drawings.

DETAILED DESCRIPTION

For a general understanding of the present embodiments, reference is made to the drawings. In the drawings, like reference numerals have been used throughout to designate like elements.

Figure 1:
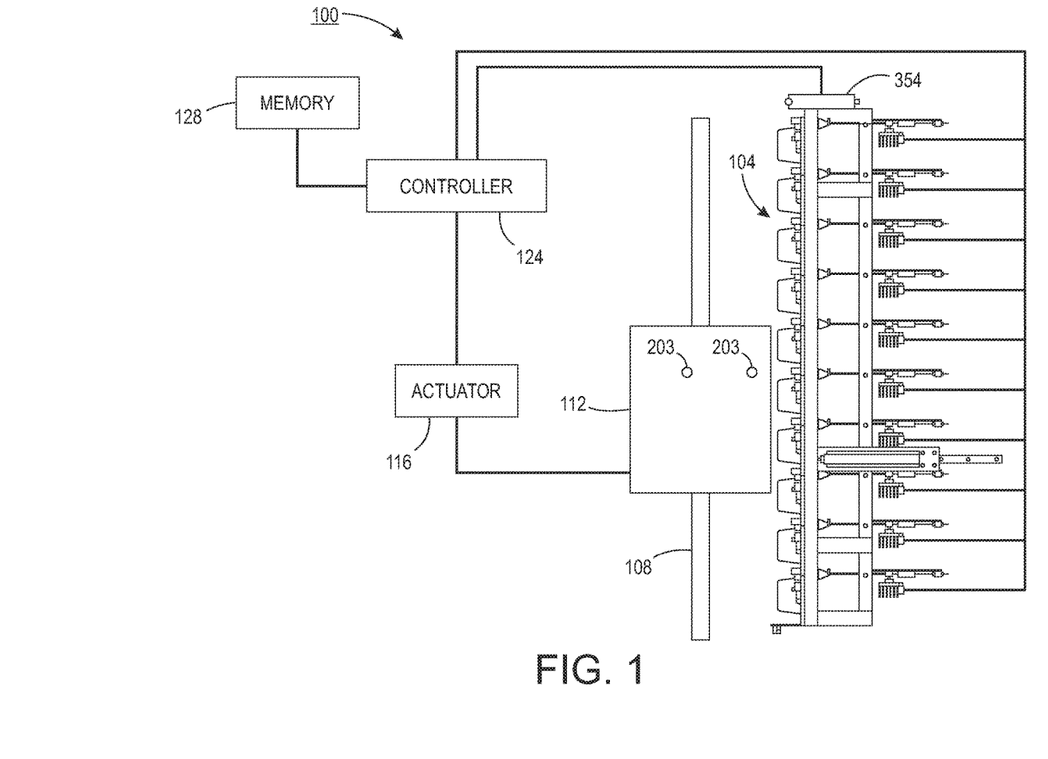
FIG. 1 illustrates an exemplary printing system 100 configured to print on a 3-D object.

FIG. 1 illustrates an exemplary printing system 100 configured to print on a 3-D object. The printing system 100 includes an array of print heads 104, a support member 108, a member 112 movably mounted to the support member 108, an actuator 116 operatively connected to the movably mounted member 112, orifices 203 used in mounting a universal object holder 200 shown in FIG. 3 to the movably mounted member 112, and a controller 124 operatively connected to the plurality of print heads and the actuator. As shown in FIG. 1, the array of print heads 104 is arranged in a two-dimensional array, which in the figure is a 10×1 array, although other array configurations can be used. Each print head is fluidly connected to a supply of marking material (not shown) and is configured to eject marking material received from the supply. Some of the print heads can be connected to the same supply or each print head can be connected to its own supply so each print head can eject a different marking material.

The support member 108 is positioned to be parallel to a plane formed by the array of print heads and, as shown in FIG. 1, is oriented so one end of the support member 108 is at a higher gravitational potential than the other end of the support member. This orientation enables the printing system 100 to have a smaller footprint than an alternative embodiment that horizontally orients the array of print heads and configures the support member, movably mounted member, and object holder 200 to enable the object holder to pass objects past the horizontally arranged print heads so the print heads can eject marking material downwardly on the objects.

The member 112 is movably mounted to the support member 108 to enable the member to slide along the support member. In some embodiments, the member 112 can move bi-directionally along the support member. Alternatively, the support member 108 could be configured to provide a return path to the lower end of the support member to form a track for the movably mounted member. The actuator 116 is operatively connected to the movably mounted member 112 so the actuator 116 can move the moveably mounted member 112 along the support member 108 and enable an object holder connected to the moveably mounted member 112 to pass the array of print heads 104 in one dimension of the 2-D array of print heads.

The controller 124 is configured with programmed instructions stored in a memory 128 operatively connected to the controller so the controller can execute the programmed instructions to operate components in the printing system 100. Thus, the controller 124 is configured to operate the actuator 116 to move an object holder installed into apertures 203 past the array of print heads 104 and to operate the array of print heads 104 to eject marking material onto the object as it passes the array of print heads 104.

Figure 2:
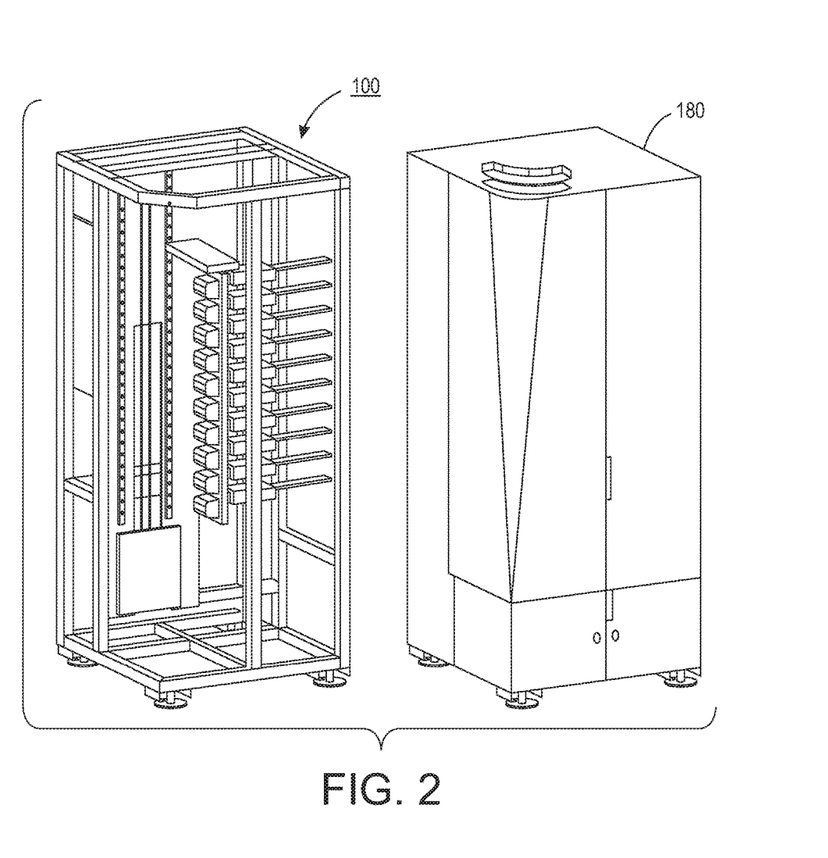
FIG. 2 depicts a cabinet within which the exemplary printing system 100 shown in FIG. 1 can be installed.

The system configuration shown in FIG. 1 is especially advantageous in a number of aspects. For one, as noted above, the vertical configuration of the array of print heads 104 and the support member 108 enables the system 100 to have a smaller footprint than a system configured with a horizontal orientation of the array and support member. This smaller footprint of the system enables the system 100 to be housed in a single cabinet 180, as depicted in FIG. 2, and installed in non-production outlets. Once installed, a universal or general object holder, as described further below, can be used with the system to print a variety of goods that are generic in appearance until printed.

Figure 3:
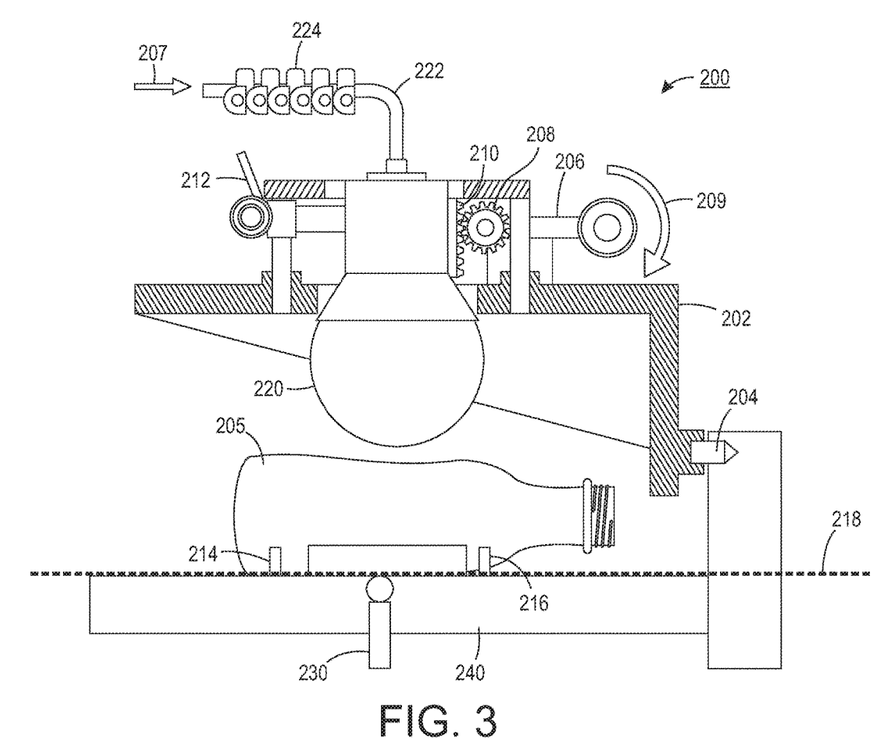
FIG. 3 illustrates an exemplary partial subassembly universal gripper that utilizes an elastic and conformable ball for stabilizing a gripped object for printing thereon in a non-object contacting position.
Figure 5:
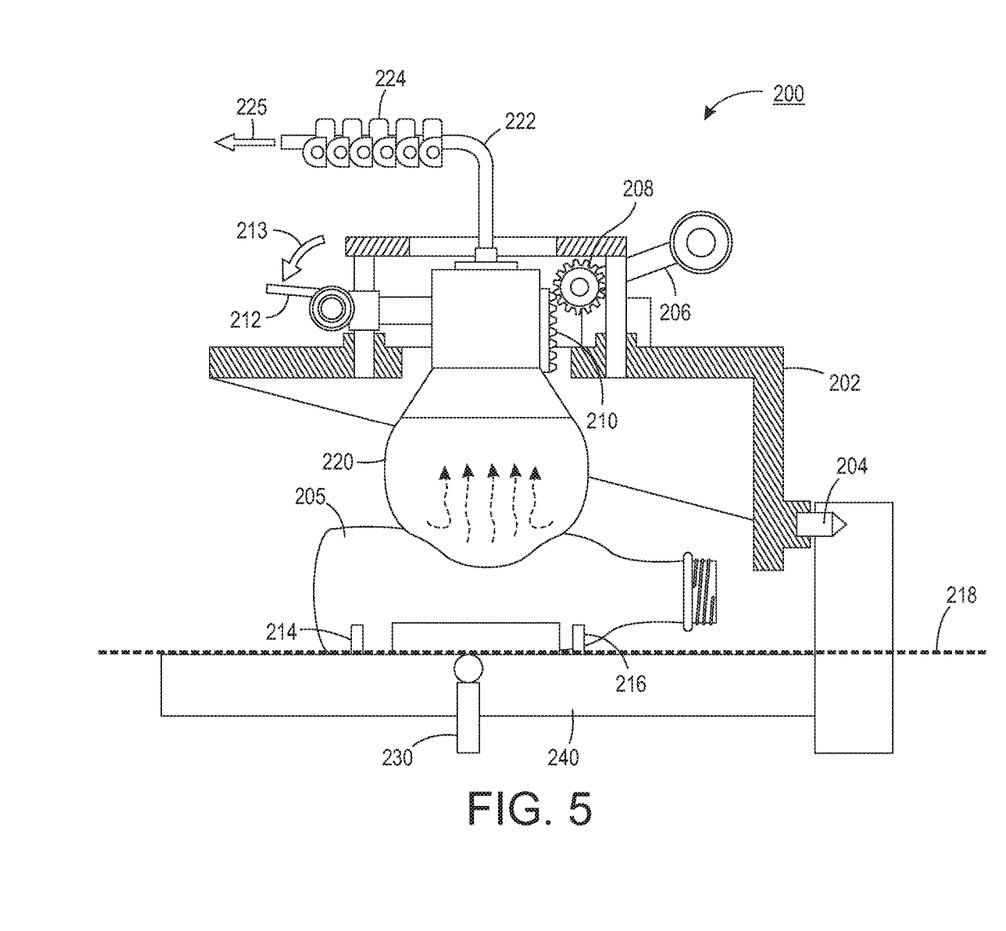
FIG. 5 shows the exemplary partial subassembly universal gripper of FIG. 4 including an optional verification system.

Turning now to the present disclosure, a generic or universal object gripper 200 in FIG. 3 includes a repositionable support fixture 202 having pins 204 inserted into a portion of base 240 onto which an object 205 to be printed upon is placed. Locating pins 214 and 216 are used to stabilize object 205 on base 240 and datum line 218 represents desired spacing of object 205 away from print heads 104 when pins 204 of universal object gripper 200 are inserted into apertures or holes 203 in moveably mounted member 112 in FIG. 1. Support fixture 202 includes an elastic and conformable ball or balloon 220 supported to move vertically within a hole in a center portion thereof with at least a bulbous portion extending inside the support fixture. One example of Balloon 220 is a VERSABALL® Kit sold by Empire Robotics. A flexible hose or tube 222 is connected to a both positive and negative pressure source indicated by arrows 207 in FIGS. 3 and 225 in FIG. 5 and is positioned within articulating track 224 and applies air pressure or vacuum pressure to balloon 220. Balloon 220 includes granular material therewithin that becomes loose and moves freely to contour to any shape when pressurized in the direction of arrow 207 from a conventional pressure source. A rack 210 and pinion 208 connected to balloon 220 are controlled by moving lever 206 in a clockwise direction as shown by arrow 209 in order to retract the balloon from object 205. Locking lever 212 holds the balloon in place. An optional conventional plunger gauge 230 can be used to verify if object 205 moved and lost the datum 218. Datum line 218 represents positioning of feed heads 104 in 3-D printing system 100.

Figure 4:
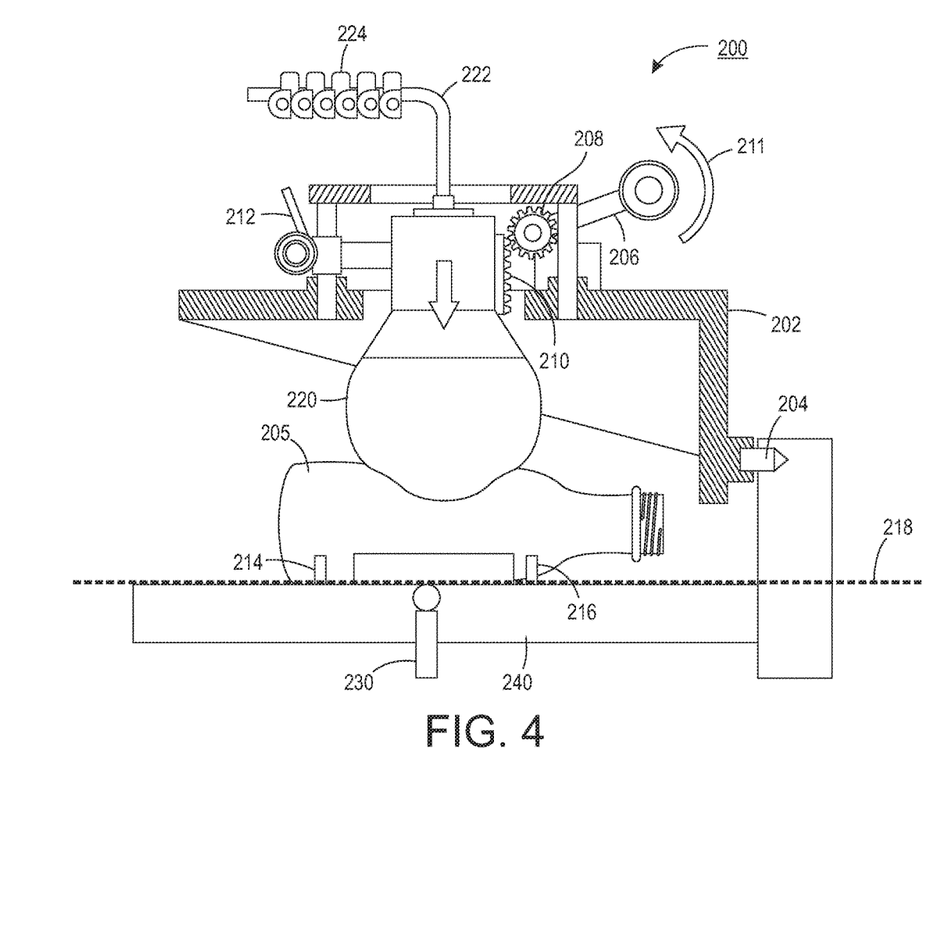
FIG. 4 shows the exemplary partial subassembly universal gripper of FIG. 3 in an object contacting position.

In FIG. 4, balloon 220 has been moved into contact with object 205 by lifting of lever 206 counter-clockwise as represented by arrow 211 causing balloon 220 to partially collapse around a portion of object 205. Next, in FIG. 5, vacuum flow indicated by arrow 225 is applied to collapsible balloon 220. This vacuum flow removes the air inside balloon 220 causing friction between particles to tighten and lock in place around a partial periphery of object 205. Lever 212 is moved in the direction of arrow 213 to lock motion of collapsible balloon 220. This step will make the system rigid. After locking the system, if the indicator 230 is showing that the object 205 is seated properly, i.e., indicator 230 reads 0.00 when object 205 is seated on base 240, then universal object holder 200 can now be moved and pins 204 of support fixture 202 can be inserted into holes 203 in movably mounted member 112 in FIG. 1 for movement past print heads 104.

Figure 6:
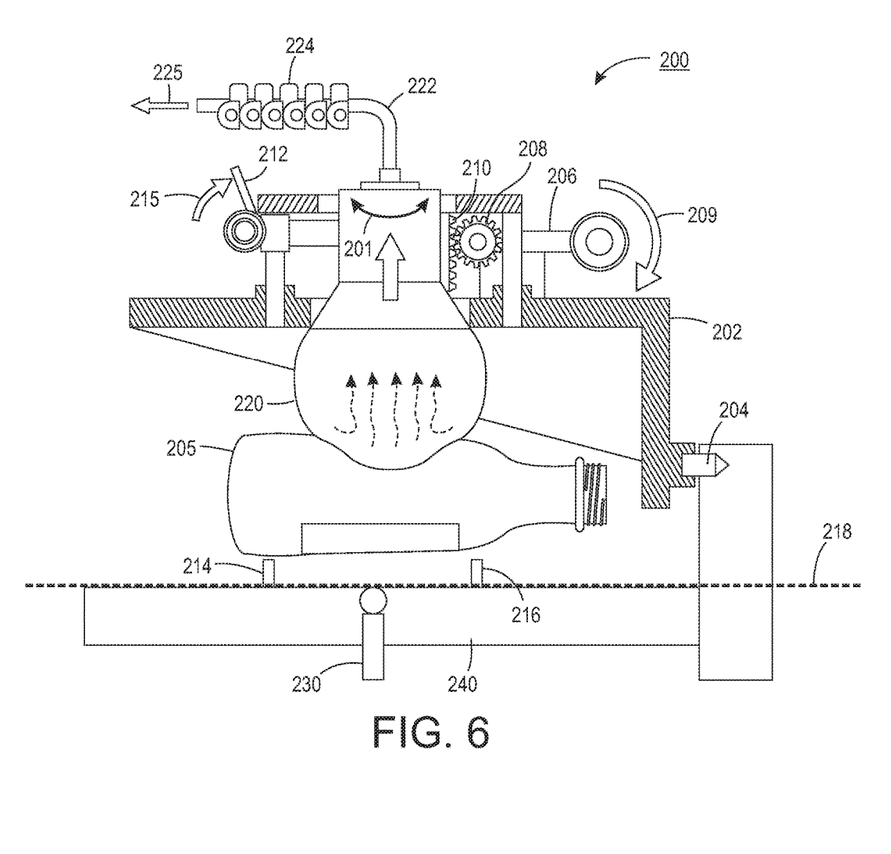
FIG. 6 illustrates the exemplary partial subassembly universal gripper of FIG. 5 in a reseating object to datum position with the object lifted from a platform.
Figure 7:
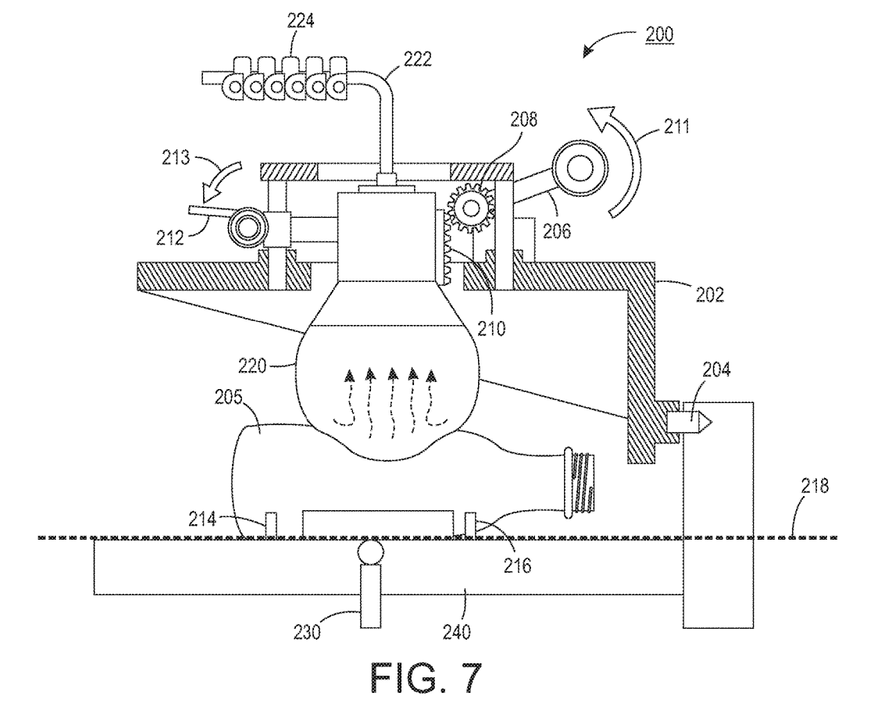
FIG. 7 illustrates the exemplary partial subassembly universal gripper of FIG. 6 reseating the object to datum position with the object repositioned on the platform.
Figure 8:
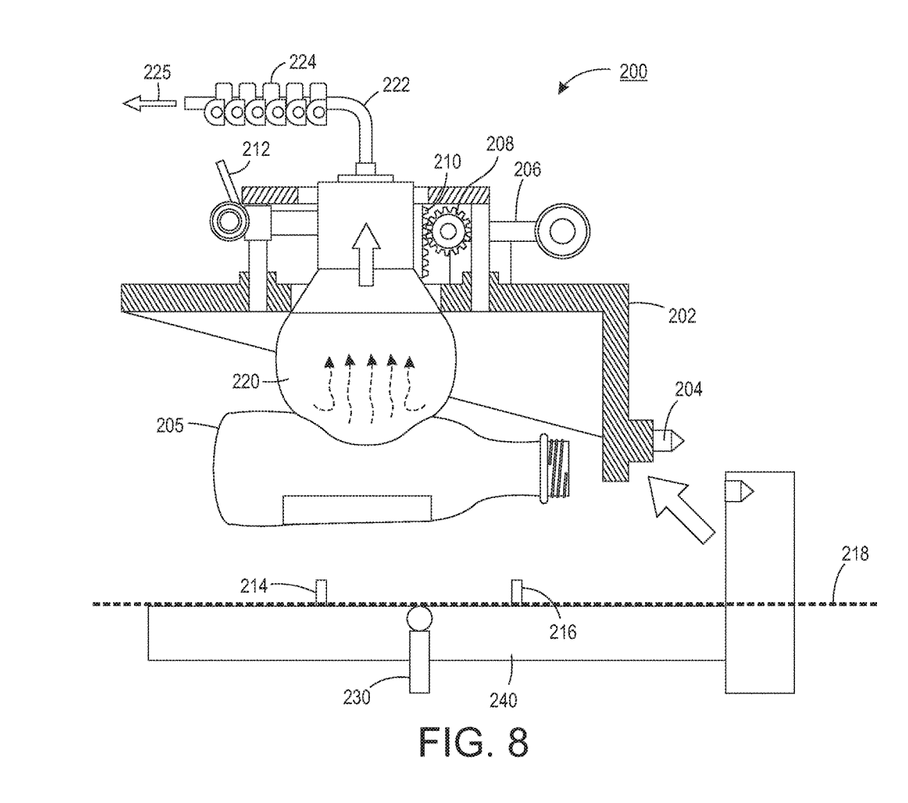
FIG. 8 depicts the exemplary partial subassembly universal gripper of FIG. 7 removed from the platform for insertion into the 3-D printer of FIG. 1.

If, however, there is an indication that object 205 has not seated properly, for example, indicator 230 does not read 0.00 when object 205 is seated on base 240, reseating of object 205 to datum line 218 is necessary, and as shown in FIG. 6. To unlock the assembly, lever 212 is pivoted in the direction or arrow 215 to allow lifting of the balloon 220 and object 205. Object 205 is lifted from base 240 by pivoting lever 206 in the direction of arrow 209. Lever 212 is pivoted in the direction of arrow 215 to allow rotary motion of balloon 220 as indicated by arrow 201. Next, as shown in FIG. 7, object 205 is reseated against base 240 and along datum line 218 by movement of lever 206 in the direction of arrow 211 until object 205 seats against base 240 and movement of lever 212 in the direction of arrow 213 locks balloon 220 against motion. In FIG. 8, universal object holder 200 has been lifted away from docking station or base 240 and ready to be installed on movably mounted member 112 by placing docking pins 204 into receptor orifices 203 for movement past print heads 104.

Figure 9A:
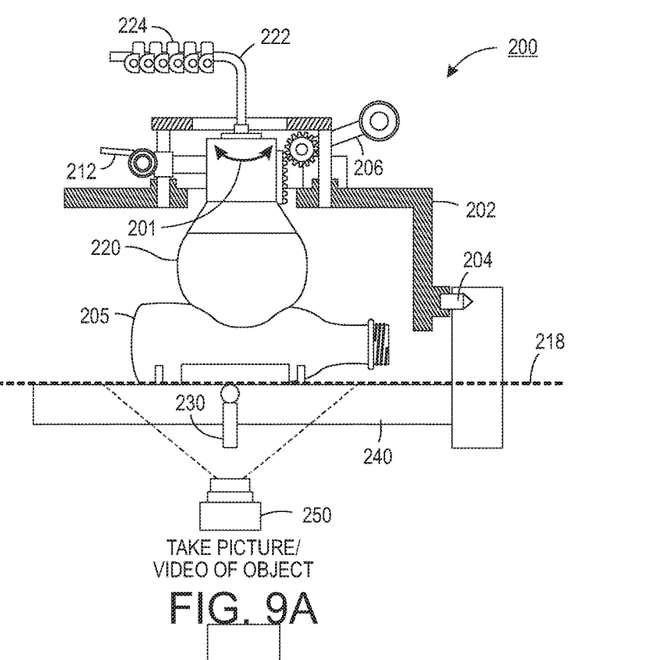
FIGS. 9A and 9B depicts optional deskew features of the exemplary partial subassembly universal gripper of FIG. 7.
Figure 9B:
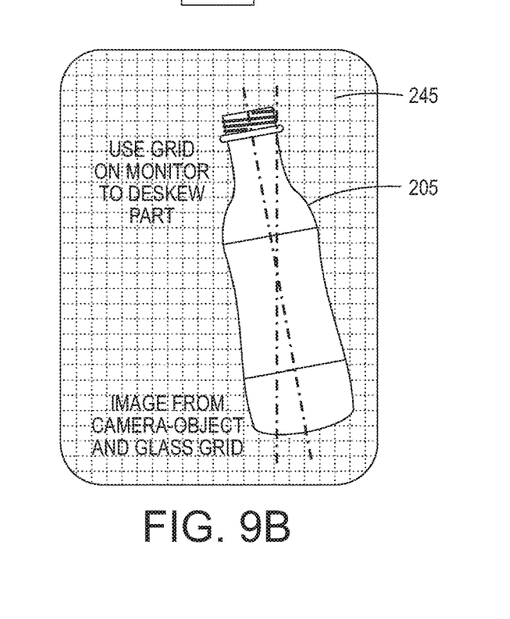

An optional deskew feature is shown in FIGS. 9A and 9B that includes a camera 250 installed under glass base 240 in order to capture a live image of object 205 and base grid alignment marks 245. The operator can then manually deskew the object by rotating support fixture 202 in the directions of arrow 201 as required using the image from the camera, object and glass grid.

It should now be understood that a universal object holder that can be used for holding objects in Direct to Object printing has been shown that includes a ball gripper mounted in a subassembly frame and docked into a loading station. The ball gripper includes particles therein that move freely and conform to the surface of an object. An object to be retrieved to have an image placed thereon is placed on a docking station surface. The ball gripper slides vertically to contact the object, but prior to contacting the object the ball is pressurized in order to allow the particles to conform to the surface of the object. Once the ball is conformed around the object, air pressure on the ball is removed by a vacuum, locking all of the particles in place. This effect holds the particles around the object while becoming a rigid assembly. Once the object and the subassembly are one rigid unit, an operator can remove the subassembly from the base and place it into the printer.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A universal object holder, comprising:
   a standalone support fixture;
   a single conformable gripper ball, said conformable gripper ball including particles therein and mounted for vertical movement within said support fixture;
   a pressure source for applying positive pressure into said conformable gripper ball so that said particles become loose and move freely to contour to an object surface;
   a device for moving said conformable gripper ball vertically into and out of engagement with an object;
   a stationary base onto which an object is placed; and
   wherein said support fixture is configured to be connected directly to said stationary base only while an object is being gripped by said conformable gripper ball and removed from said stationary base and inserted into an apparatus while the object is simultaneously being gripped by said conformable gripper ball.

2. The universal object holder of claim 1, wherein said pressure source is adapted to apply a vacuum to said conformable gripper ball once an object has been contacted on said stationary base.

3. The universal object holder of claim 2, wherein said vacuum applied to said conformable gripper ball causes said particles within said conformable gripper ball become rigid and grip an object.

4. The universal object holder of claim 3, including a locking lever adapted to be manipulated to prevent motion of said conformable gripper ball.

5. The universal object holder of claim 4, wherein said locking lever is moved in a clockwise direction to prevent rotational motion of said conformable gripper ball.

6. The universal object holder of claim 5, including a plunger gauge used to indicate if an object moved while seated on an upper surface of said stationary base and thereby signaling that resetting of the object to a predetermined datum is required.

7. The universal object holder of claim 1, wherein said device for moving said conformable gripper ball vertically into and out of engagement with an object is a rack and pinion mechanism.

8. The universal object holder of claim 7, wherein said rack and pinion mechanism includes a lever and wherein said lever is moved in a counter-clockwise direction to load said conformable gripper ball against an object.

9. The universal object holder of claim 1, wherein said support fixture includes locating pins used to connect said support fixture to a printer that prints on 3-D objects.

10. An apparatus for securely gripping various object shapes, comprising:
    a support device and a conformable elastic balloon configured for vertical movement within said support device, said conformable elastic balloon being filled with granular material that goes from a conformable to rigid state when vacuum is applied;
    a pressure source adapted to apply air pressure into said conformable elastic balloon to loosen and free up movement of said granular material and subsequently apply a vacuum to said conformable elastic balloon to remove friction between the granular material to thereby tighten and lock said conformable elastic balloon to an object;
    a stationary base member configured for placement of an object on an upper surface of said stationary base member;
    a mechanical mechanism configured to lower said conformable elastic balloon within said support device into contact with an object, grip the object and then raise the object away from said upper surface of said stationary base member; and
    locking mechanisms that lock said conformable elastic balloon against vertical and rotary movement once contact has been made with an object on said upper surface of said stationary base member.

11. The apparatus of claim 10, wherein said upper surface of said stationary base member is in-line with a datum line representing print head locations in a printer that prints on 3-D objects.

12. The apparatus of claim 10, including a gauge mechanism positioned within said stationary base member for verifying if an object moved and lost its original positioning on said upper surface of said stationary base member.

13. The apparatus of claim 12, wherein said locking mechanisms include a lever controlled rack and pinion device.

14. The apparatus of claim 13, wherein said support device includes locating pins for incorporating said support device within a printer that prints on 3-D objects.

15. A method for gripping and holding objects of various shapes and sizes, comprising:
providing a support device;
providing a single conformable gripper ball configured for vertical movement within said support device;
filling said conformable gripper ball with granular material that goes from a conformable to rigid state when vacuum is applied;
providing a pressure source adapted to apply air pressure into said conformable gripper ball to free up movement of said granular material before contacting an object and subsequently apply a vacuum to said conformable gripper ball after contacting an object to remove friction between said granular material to thereby tighten and lock said conformable gripper ball to an object;
providing a glass stationary base member and an object contacting upper surface of said glass stationary base member, and wherein said support device is connected to said glass stationary base member;
providing a mechanical mechanism configured to lower said conformable gripper ball within said support device into contact with an object and grip said object and then raise said object away from said upper surface of said stationary base member; and
providing locking mechanisms that lock said single conformable gripper ball against vertical and rotary movement once contact has been made with said object.

16. The method of claim 15, including providing a datum line along said upper surface of said glass stationary base member for determining if an object positioned on said glass stationary base member has moved away from said datum line, and if the object has moved, reseating the object to said datum line.

17. The method of claim 15, including providing a grid on said stationary base member and using said grid to monitor deskew of said object on said glass stationary base member.

18. The method of claim 17, including providing images of said object on said glass grid and using said images on said grid to deskew said object.

19. The method of claim 15, including removing said support device from said stationary base member and inserting said support device into a printer that prints on 3-D objects.

* * * * *